INVENTORS
ALVIN O. WOLF
JAMES H. KRAMER
BY W. A. Shira, Jr.
ATTY.

3,541,873
SPROCKET
Alvin O. Wolf and James H. Kramer, Akron, Ohio, assignors to The B. F. Goodrich Company, New York, N.Y., a corporation of New York
Filed July 1, 1968, Ser. No. 741,801
Int. Cl. F16h 55/14
U.S. Cl. 74—243         5 Claims

ABSTRACT OF THE DISCLOSURE

The present invention discloses a driving sprocket for an elastomeric traction belt, the sprocket having a circular shell of stamped metal halves spot-welded together and a ring of elastomer disposed circumferentially around the shell with a plurality of elastomeric lugs formed in the outer periphery of the ring extending radially outwardly therefrom.

BACKGROUND OF THE INVENTION

Elastomeric traction belts of the type used for vehicles intended for high-speed movement over soft surfaces, such as snow or sand, are commonly driven by engagement of the toothed portions of a driving sprocket with apertures in the belt. If the teeth of the sprocket are made of a hard non-resilient material, the sprocket teeth tend to deform and eventually damage the portion of the edges of the apertures in the elastomeric belt which are contacted under driving pressure by the surface of the sprocket teeth.

Attempts have been made to cover the contact-pressure surfaces of sprocket teeth with elastomeric material in order to provide a more resilient surface for contacting the edges of the apertures in the elastomeric belt. However, providing an elastomeric covering to a toothed metal sprocket requires bonding the elastomer securely to the metal, usually by molding the elastomeric material to the metal sprocket during vulcanizing of the elastomeric material. This technique has proved to be time consuming and costly. Furthermore, it has been found difficult to provide a resilient cover for the sprocket teeth which will withstand the rapid contact pressure and shear cycling of alternate engagement and disengagement of the teeth with the sides of the apertures in the belt. Frequently, the elastomeric covering becomes loosened by high speed driving engagement and portions become detached and/or the contact pressure between the uncovered metal portions of the teeth and the sides of the belt apertures cause failure of the elastomeric material under compression.

An alternative expedient which has been tried, generally unsuccessfully, is that of making the entire sprocket of elastomeric material. In an all-elastomer sprocket, the resilience of the web region permits torsional and axial oscillation of the web which in turn causes lateral and longitudinal vibration of the traction belt when it is engaged with such a sprocket. Vibration of the traction belt under driving load is often a source of "wandering" of the belt in its orbital plane which frequently results in premature failure of the belt from excessively rapid wear.

SUMMARY OF THE INVENTION

The present invention provides a unique solution to the problems described above relating to a driving sprocket for engaging an elastomeric traction belt. The driving sprocket, disclosed and claimed herein, incorporates a partially hollow web-shell formed of two circular metal halves securely joined together. The outer periphery of each half is flared axially outward to form a flanged edge with radial recesses spaced around the flange. An elastomeric ring is securely bonded continuously over the outer edge of the flange with elastomeric material positively engaging the radial recesses in the flange. The outer periphery of the elastomeric ring has outwardly extending lugs spaced circumferentially around the ring to form the driving teeth of the sprocket. The invention thus comprises a novel sprocket having a light weight metal web and hub with an outer ring of elastomeric material having sprocket teeth extending therefrom with portions of the inner periphery received in positive engagement with recesses in the metal web.

DETAILED DESCRIPTION

Figure 1:
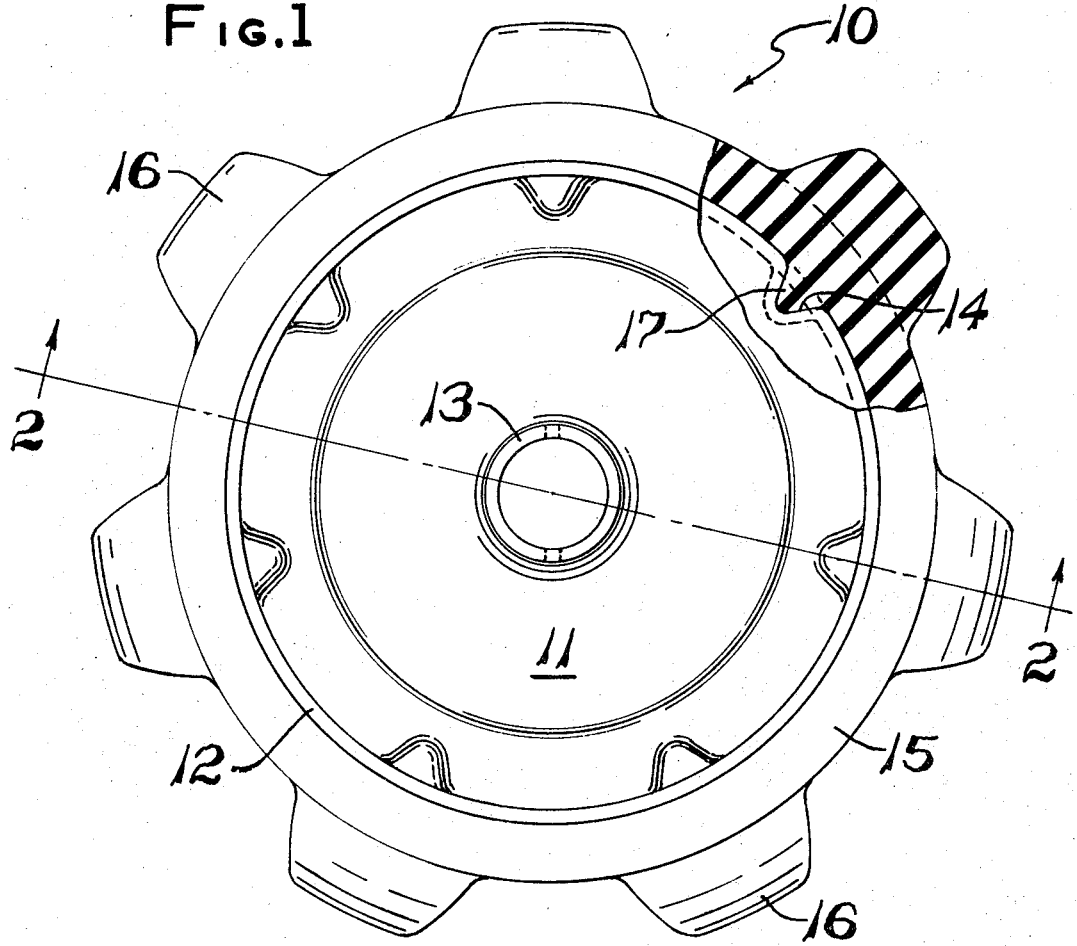
FIG. 1 is a side view of the sprocket with a portion of the shell flange and elastomeric ring broken away to expose one of the radial recesses in the shell.
Figure 2:
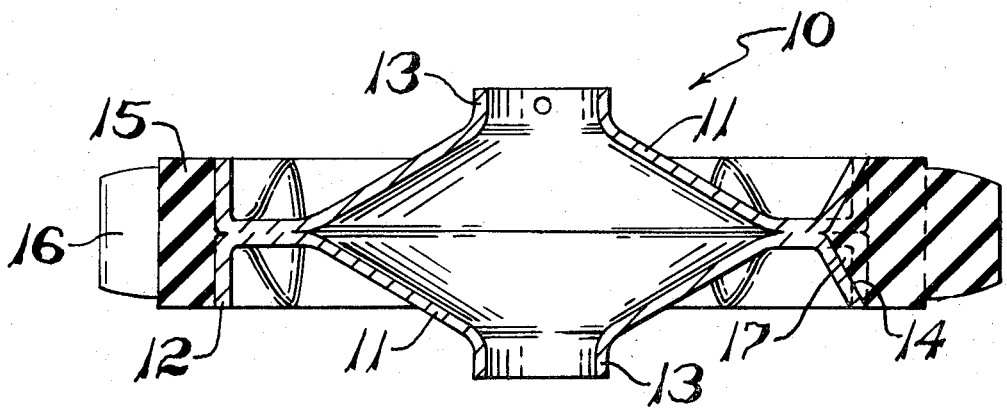
FIG. 2 is a sectional view taken along the section indicating lines 2—2 of FIG. 1.

Referring now to FIGS. 1 and 2, the sprocket 10 is shown as made of two symmetrical metal halves 11 joined securely together, preferably by a plurality of circumferentially evenly spaced spot welds. Each half 11 comprises integral portions defining one-half of the hub, web and rim. Each half is preferably in the form of a shell having a conical shape near the central portion and the hub portion 13 of each shell half is formed by flaring axially outwardly the smaller diameter portion of the conically shaped shell. The radially outer region of each shell half is flared from the conical shape and extends perpendicularly to the axis of the sprocket with the outer circular periphery of each shell half flared axially outwardly to form one half of an edge flange 12 which extends parallel to the axis of the sprocket and concentrically therearound. The edge flange 12 has a plurality of radial recesses 14 formed therein and disposed in circumferentially equally spaced arrangement about the periphery of the shell flange 12. In the preferred form of the invention, the recesses 14 are in the form of stamped "V" grooves but the recess 14 need not have a generally "V" shape but may be made to any suitable and convenient cross sectional shape. In the embodiment as shown in FIGS. 1 and 2, the shell halves are spot-welded together as mentioned above. However, it is not necessary that the shell halves be spot welded. Any convenient mechanical expedient such as bolts, rivets or adhesives may be employed to securely join the halves of the shell.

Provision is made for a mechanical locking means to secure the hub of the shell to a driving shaft (not shown), passing centrally therethrough, for preventing relative rotation between the shaft and the hub portion 13 of the shell. In the presently preferred practice of the invention, a diametral hole is provided through the hub 13 such that a pin or rod may be inserted through the hub and into a corresponding hole in the shaft to which the sprocket is to be attached. However, any suitable mechanical expedient may be employed to secure the sprocket to the shaft and the invention is not limited to the particular provisions for a locking pin arrangement shown in the embodiment of FIGS. 1 and 2.

An elastomeric ring 15 is securely bonded to the outer periphery of the edge flange 12 of each shell half 11 such that the ring extends circumferentially continuously around the flange with portions 17 of elastomeric material extending into the radial recesses 14 in positive engagement thereby preventing relative rotation between the ring 15 and the edge flanges 12. A plurality of integral sprocket teeth 16 extend radially outwardly from the outerperiphery of the ring 15 and are disposed therearound in circumferentially equally spaced arrangement.

In the presently preferred practice, the radial depth of the ring 15 and the sprocket teeth 16 are generally the same.

In the present practice of the invention, the ring 15 is secured integrally onto edge flange 12 of the shell halves 11 during vulcanizing of the elastomeric ring 15 by placing the shell and the elastomeric material in a suitable mold and vulcanizing the elastomer integrally with the shell. However, the invention is not limited to this practice and the elastomeric ring may be vulcanized separately and attached over the edge flange, after vulcanizing, with the portions 17 of the elastomeric ring extending in positive engagement with the recesses 14 in the shell. If such a separate assembly method is used, it will generally be desirable to provide a separate adhesive material to bond the inner periphery of the elastomeric material 15 to the outer periphery of the edge flange 12 and the portions 17 in the recesses 14.

The invention thus comprises a unique driving sprocket having a light-weight metal shell and integral hub with an elastomeric ring securely bonded around the outer circular edge of the shell, the ring and shell having provisions for positive inter-engagement for preventing relative rotation therebetween. Elastomeric sprocket teeth are provided around the outer periphery of the elastomeric ring for engaging in a positive driving manner with apertures in an elastomeric traction belt.

Modifications and adaptations may be made by persons having ordinary skill in the art, the invention being limited only by the spirit and scope of the appended claims.

We claim:
1. A sprocket for driving an apertured elastomeric traction belt comprising:
  (a) a circular web and rim of rigid material;
  (b) a plurality of radial recesses formed in the said rim in circumferentially spaced arrangement about the periphery thereof;
  (c) an endless ring of elastomeric material disposed in circumferentially superposed arrangement about the outer periphery of said rim and securely bonded thereto;
  (d) said ring having a plurality of lugs extending radially inward from its inner periphery with each lug received in interengagement with one of the said recesses in the rim; and,
  (e) a plurality of sprocket teeth formed in the outer periphery of said ring, said teeth extending radially outward therefrom in circumferentially equally spaced arrangement for engaging apertures in an elastomeric belt.

2. The sprocket defined in claim 1, wherein said sprocket teeth and said ring have generally equal radial depths.

3. The sprocket as defined in claim 1, wherein said web includes two portions axially spaced from each other for at least a portion of their radial extent.

4. The sprocket defined in claim 1, wherein said web and rim are formed integrally of two symmetric frustro-conical halves having the apex of each cone lying axially outwardly of each half parallel with the sprocket axis and the halves are symmetric about the axial midplane with one-half of said rim comprising an integral outwardly flared portion of each half, the said halves being united with their flanges extending in opposite directions.

5. The sprocket defined in claim 4 wherein each of said halves has a central hole therethrough with the inner periphery thereof flared axially outward to form a hub on each axial side of said sprocket.

References Cited

UNITED STATES PATENTS

| | | | |
|---|---|---|---|
| 2,724,975 | 11/1955 | Drummond | 74—230.8 |
| 2,827,796 | 3/1958 | Erickson | 74—443 XR |
| 3,211,016 | 10/1965 | Carter | 74—230.7 |
| 3,216,267 | 11/1965 | Dolza | 74—230.4 |

FOREIGN PATENTS

| | | |
|---|---|---|
| 625,922 | 8/1961 | Canada. |
| 1,101,559 | 4/1955 | France. |

JAMES A. WONG, Primary Examiner

U.S. Cl. X.R.

74—411, 443

PO-1050
(5/69)

UNITED STATES PATENT OFFICE
CERTIFICATE OF CORRECTION

Patent No. 3,541,873          Dated November 24, 1970

Inventor(s) Alvin O. Wolf and James H. Kramer

It is certified that error appears in the above-identified patent and that said Letters Patent are hereby corrected as shown below:

Column 3, line 35, after "circumferentially" insert ---equally

OPENED AND
SEALED
MAR 2 1971

(SEAL)
Attest:

Edward M. Fletcher, Jr.
Attesting Officer

WILLIAM E. SCHUYLER,
Commissioner of Patent